US 7,609,372 B1
Oct. 27, 2009

(12) United States Patent
Tsai

(54) SYSTEM AND METHOD FOR MEASURING LENGTH OF CAMERA LENS

(75) Inventor: Kun-Jung Tsai, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/327,521

(22) Filed: Dec. 3, 2008

(30) Foreign Application Priority Data

May 6, 2008 (CN) .......................... 2008 1 0301431

(51) Int. Cl.
*G01B 9/00* (2006.01)
*C02B 7/02* (2006.01)
*G06K 9/00* (2006.01)

(52) U.S. Cl. ................. 356/124; 356/124.5; 250/201.2; 382/103; 382/275; 359/811

(58) Field of Classification Search ................. 356/124, 356/124.5, 125, 126, 127; 250/201.2, 204, 250/223 B, 223 R; 382/100, 102, 103, 104, 382/106, 107, 275, 199, 255; 359/811, 813, 359/819, 394, 781
See application file for complete search history.

(56) References Cited

U.S. PATENT DOCUMENTS

| | | | | |
|---|---|---|---|---|
| 5,574,555 A | * | 11/1996 | Yamaguchi et al. | 356/125 |
| 6,072,570 A | * | 6/2000 | Chipman et al. | 356/124 |
| 6,346,981 B1 | * | 2/2002 | Karbe et al. | 356/124 |
| 6,788,399 B2 | * | 9/2004 | Frumusa et al. | 356/124 |
| 7,443,492 B2 | * | 10/2008 | Chang | 356/124 |
| 7,457,434 B2 | * | 11/2008 | Azar | 382/103 |
| 7,499,600 B2 | * | 3/2009 | Ojanen et al. | 382/275 |
| 2004/0189853 A1 | | 9/2004 | Takeuchi et al. | |

* cited by examiner

*Primary Examiner*—Sang Nguyen
(74) *Attorney, Agent, or Firm*—Clifford O. Chi

(57) ABSTRACT

A system for measuring a total track length of a telescopic lens includes a testing chart, a light source, a processor, a display screen and a range finder. The lens and an image sensor are received in a holder. The testing chart has a frame pattern and a plurality of line pair patterns. The testing chart faces and aligns with the image sensor for allowing the image sensor to capture an image of the testing chart. The processor analyzes the image generated by the image sensor, so as to obtain a modulation transfer function value representative of a precision focal position of the lens. The range finder measures a first distance between the image sensor and the range finder, a second distance between the lens and the range finder, and calculates a distance difference between the first and second distances to obtain the total track length of the lens.

13 Claims, 3 Drawing Sheets

SYSTEM AND METHOD FOR MEASURING LENGTH OF CAMERA LENS

CROSS-REFERENCE TO RELATED APPLICATION

Relevant subject matter is disclosed in co-pending U.S. patent application Ser. No. 12/170,761 filed on Jul. 7, 2008 and entitled "SYSTEM AND METHOD FOR MEASURING OPTICAL RESOLUTION OF LENS". The co-pending U.S. patent application is assigned to the same assignee as the instant application. The disclosure of the above-identified co-pending application is incorporated herein by reference.

BACKGROUND

1. Technical Field

This disclosure relates to camera lens length measuring systems, and particularly to a system and a method for measuring a total track length of a telescopic camera lens.

2. Description of Related Art

Camera modules are generally installed in mobile telephones, personal digital assistants or other portable electronic apparatuses to record memorable moments due to their convenience and practicality. The designs of the portable electronic apparatuses have evolved toward lightweight and compactness tendency, so have the currently popular digital camera modules.

The digital camera module generally includes a lens, a sensor for converting light transmitted through the lens into electronic image signals, and a motor for driving the lens into telescopic movement. Most portable electronic apparatuses equipped with camera modules have a limited internal space, in such a condition, a total track length (a distance between a first surface of the lens and a film surface of the sensor) of the lens need to be relatively short. However, the short total track length of the lens makes it difficult for the camera module to achieve a high optical performance while being compact, especially during the telescopic movement of the lens.

What is needed, therefore, is a system and method for measuring a total track length a lens, which is capable of identifying whether the camera module with the lens is suitable for the portable electronic apparatuses while maintaining a high optical performance.

SUMMARY

A system for measuring a total track length of a telescopic lens is provided. The telescopic lens and an image sensor are received in a holder. The telescopic lens is movable relative to the image sensor. The system includes a testing chart, a light source, a processor, a display screen and a range finder. The testing chart has a frame pattern and a plurality of line pair patterns arranged in the frame pattern. Each of the line pair patterns includes a plurality of black and white line pairs. The testing chart faces the holder. The light source is for illuminating the testing chart. The testing chart is configured for facing and aligning with the image sensor for allowing the image sensor to capture an image of the line pair patterns of the testing chart. The processor is configured for analyzing the line pair patterns of the testing chart of the image generated by the image sensor, so as to obtain a modulation transfer function value representative of a precision focal position of the lens. The display screen is configured for displaying the image generated by the image sensor and the modulation transfer function value thereon. The range finder is configured for measuring a first distance between the image sensor and the range finder, a second distance between the lens and the range finder, and calculating a distance difference between the first distance and the second distance to obtain the total track length of the lens.

Other advantages and novel features of the present system will become more apparent from the following detailed description of embodiment when taken in conjunction with the accompanying drawings.

BRIEF DESCRIPTION OF THE DRAWINGS

Many aspects of the system and method can be better understood with reference to the following drawings. The components in the drawings are not necessarily drawn to scale, the emphasis instead being placed upon clearly illustrating the principles of the present system and method. Moreover, in the drawings, like reference numerals designate corresponding parts throughout the several views.

DETAILED DESCRIPTION OF THE EMBODIMENTS

Figure 1:
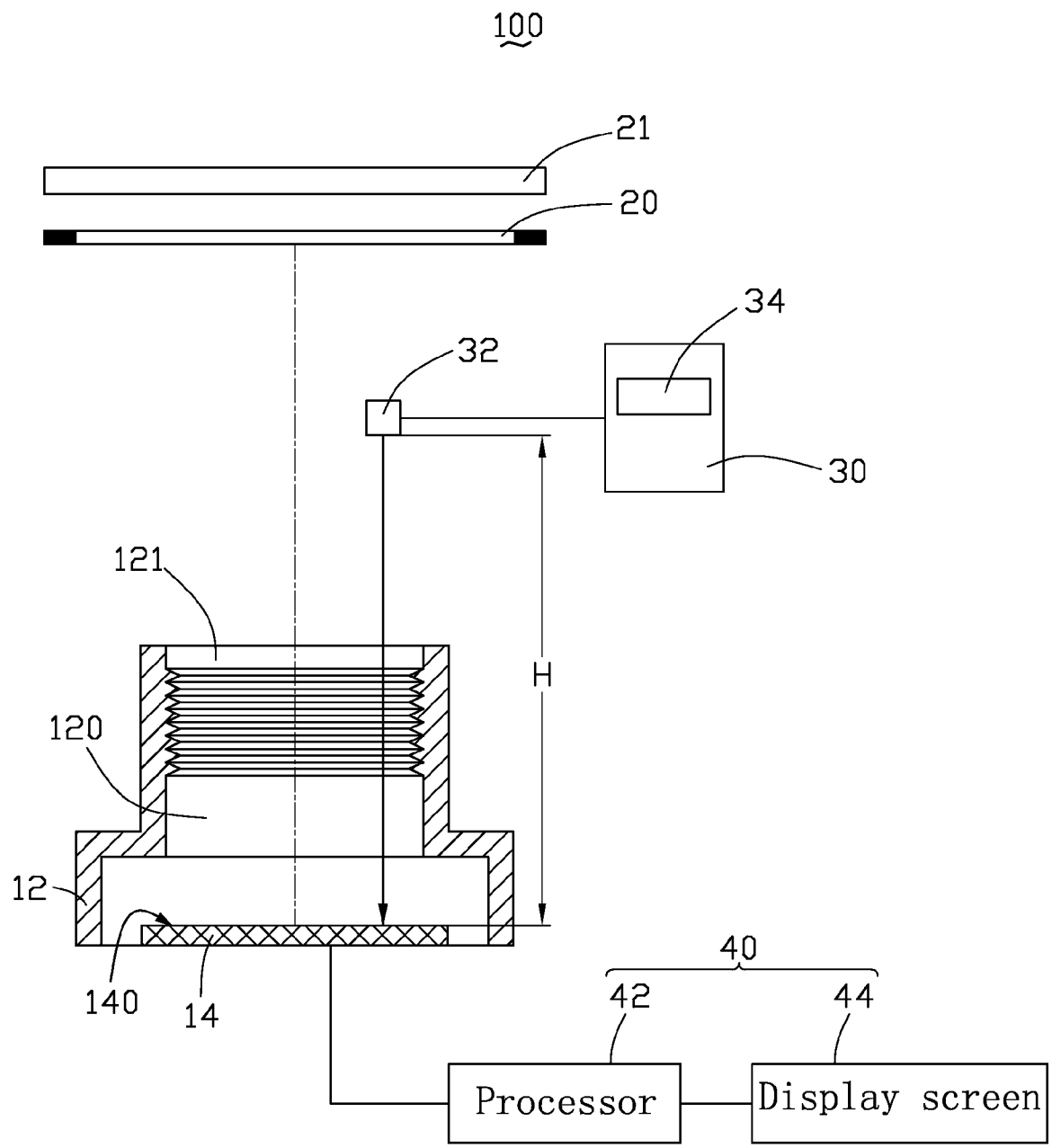
FIG. 1 is a schematic view of a system for measuring a total track length of a lens in accordance with a first step of an exemplary embodiment.
Figure 2:
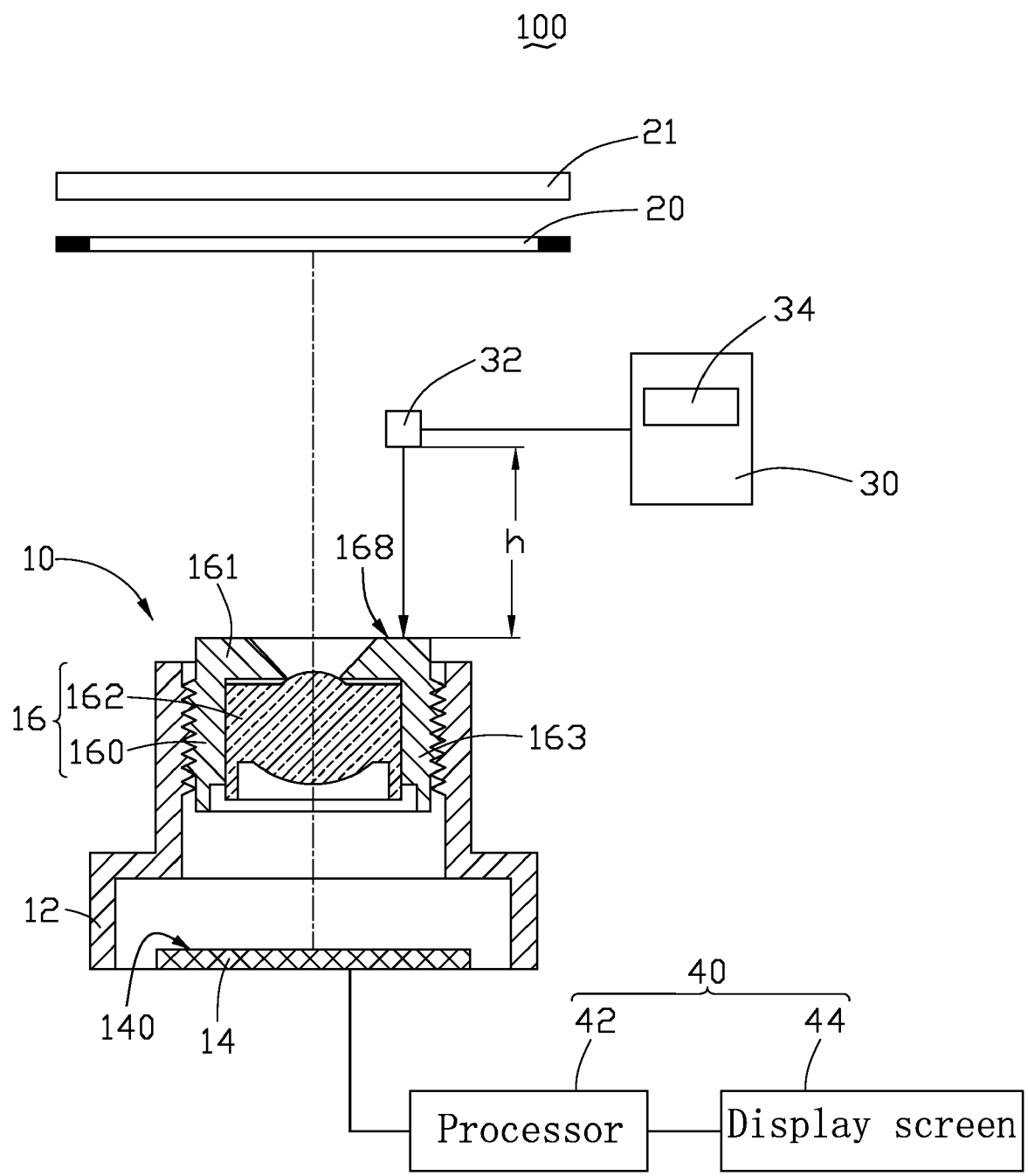
FIG. 2 is a schematic view of the system for measuring the total track length of the lens in accordance with a second step of the exemplary embodiment.

Referring to FIG. 1 and FIG. 2, an exemplary system 100 for measuring a total track length of a lens is provided. The system 100 includes a camera module 10, a testing chart 20, a light source 21, a range finder 30 and a computer 40.

The camera module 10 includes a holder 12, an image sensor 14 and a lens system 16. A receiving space 120 is defined in a central portion of the holder 12 for receiving the image sensor 14 and the lens system 16 therein. An opening 121 is defined in a top end of the holder 12. A plurality of first screw threads is formed on an inner surface of the holder 12 adjacent to the opening 121. The lens system 16 includes a tubular lens barrel 160 and a substantially cylindrical lens 162. The lens 162 is fixedly received in the lens barrel 160. The lens barrel 160 includes an annular sidewall 163 and a top wall 161 extending horizontally and inwardly from a top end of the sidewall 163. A plurality of second screw threads corresponding to the first screw threads is formed on an outer surface of the sidewall 163. The second screw threads are screwed into the first screw threads for threadingly engaged the lens system 16 and the holder 12 together. During operation of the camera module 10, the lens system 16 moves telescopically along an axial direction of the holder 12. The image sensor 14 is received in a bottom end of the receiving space 120. The image sensor 14 can be selected from a charge coupled device (CCD) and a complementary metal oxide semiconductor transistor (CMOS). The image sensor 14 has an image sensing area (in present embodiment, the entire top surface of the image sensor 14 is the image sensing area).

The testing chart 20 is located over the camera module 10 and spaced a distance from the camera module 10. The distance between the testing chart 20 and the camera module 10 is substantially the same as a minimum focus distance of the lens 162 of the camera module 10. When the camera module 10 is focused on the testing chart 20, the lens 162 protrudes out of the holder 12 of the camera module 10 through the opening 121 farthest. In the present embodiment, the minimum focus distance of the lens 162 is about 0.6 m (meter).

Figure 3:
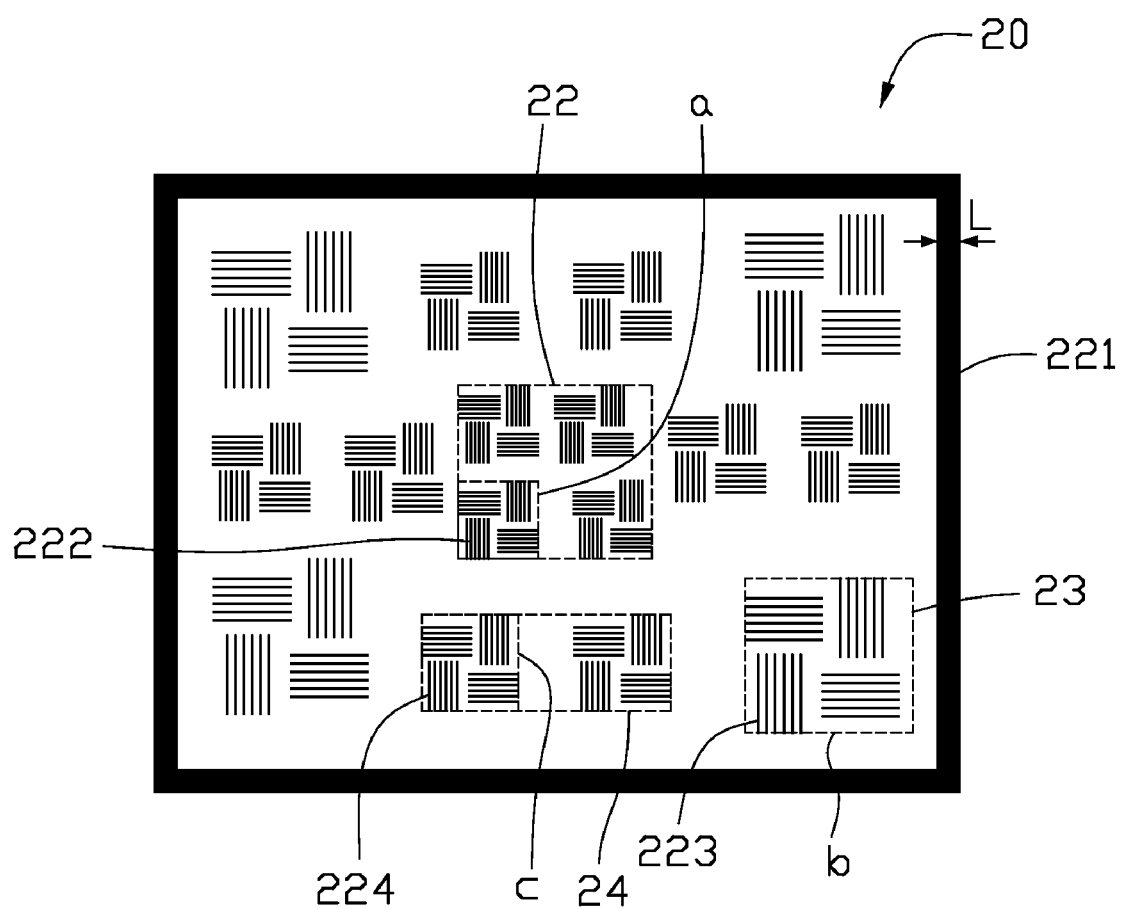
FIG. 3 is a top plane view of a testing chart of the measuring system of FIG. 1.

Referring to FIG. 3, the testing chart 20 includes a frame pattern 221 and a plurality of line pair patterns 222, 223, 224 arranged in the frame pattern 221. The frame pattern 221 is rectangular. In order to achieve a contrasting view of the line pair patterns 222, 223, 224 for the lens 162 and the image sensor 14, the frame pattern 221 is highlighted relative to the line pair patterns 222, 223, 224 with a width L in range of 0.5 mm and 2 mm (millimeter). Each of the line pair patterns 222, 223, 224 includes a plurality of black and white parallel line pairs. The line pair patterns 222, 223, 224 are different from each other in spatial frequency, i.e., the number of the black and white line pairs per millimeter distance in each of the line pair patterns 222, 223, 224 is different. In areas a, b, and c, each includes four corresponding line pair patterns 222, 223, 224, and the line pair of adjacent line pair patterns 222, 223, 224 are perpendicular to each other. One area 22 is located on a central portion of the frame pattern 221 and comprised of four areas a. Four areas 23 are located on four corners of the frame pattern 221, respectively. Each of the areas 23 is comprised of one area b. Four areas 24 are located on four sides of the area 22, respectively. Each of the areas 24 is comprised of two areas c arranged side by side. The frame pattern 221 and the line pair patterns 222, 223, 224 of the testing chart 20 faces the lens 160.

The light source 21 is located over the testing chart 20. The light source 21 can be a light emitting diode (LED), and is configured for illuminating the testing chart 20. Light arrived at the testing chart 20 is reflected by the frame pattern 221 and the line pair patterns 222, 223, 224 to the lens 160. The reflected light then passes through the lens 160 to the image sensor 14, and the image sensor 14 is capable of receiving and converting light transmitted through the lens 162 into electronic image signals associated with the frame pattern 221 and the line pair patterns 222, 223, 224.

The range finder 30 is located between the camera module 10 and the testing chart 20. The range finder 30 includes an optoelectronic emitting and receiving unit 32 and a calculating unit 34. During operation of the range finder 30, the emitting and receiving unit 32 firstly generates a laser light to a first aimed surface 140, i.e., the top surface of the image sensor 14, and receives the laser light which is reflected by the first aimed surface 140, thereby obtaining a distance between the first aimed surface 140 and the range finder 30. In the same way, the emitting and receiving unit 32 generates another laser light to a second aimed surface 168, i.e., a top surface of the top wall 161 of the lens barrel 160, and receives the laser light which is reflected by the second aimed surface 168, thereby obtaining a distance between the second aimed surface 168 and the range finder 30. The calculating unit 34 calculates a distance difference between the first aimed surface 140 and the second aimed surface 168, i.e., the top surface of the image sensor 14 and the top surface of the top wall 161 of the lens barrel 160, which is a total extendable length of the lens 162. Accordingly, when the lens 162 protrudes out of the holder 12 with respective to the image sensor 14, a maximal total tack length of the lens 162 can be obtained.

The computer 40 is electrically connected to the image sensor 14. The computer 40 includes a processor 42 and a display screen 44. The processor 42 mainly has an analog-to-digital converter and an optical resolution analyzer therein. The analog-to-digital converter is configured for converting the electronic image signals associated with the frame pattern 221 and the line pair patterns 222, 223, 224 from the image sensor 14, which are in form of analog image signals, into a form of digital image signals. The optical resolution analyzer is configured for analyzing the image signals associated with the line pair patterns 222, 223, 224 from the analog-to-digital converter according to a Modulation Transfer Function (MTF), for example, $MTF=(I_{max}-I_{min})/(I_{max}+I_{min})$, with $I_{max}$ representing an intensity of the white lines in one of the line pair patterns 222, 223, 224 or one of the areas 22, 23, 24, and $I_{min}$ representing an intensity of the black lines in the same one of the line pair patterns 222, 223, 224 or the same one of the areas 22, 23, 24. The optical resolution analyzer can calculate the MTF value for a number of times, thereby capable of providing an average MTF value to represent a precision focusing position of the lens 162.

The display screen 44 is electrically connected to the processor 42. During a telescopic movement of the lens 162, the display screen 44 can displays the image associated with the frame pattern 221 and the line pair patterns 222, 223, 224 from the image sensor 14 and the MTF value thereon. When the camera module 10 is focused on the testing chart 20 which is located on the minimum focus distance of the lens 162, the average MTF value reaches its maximum and the lens 162 stops on the focusing position. Simultaneously, the lens 162 protrudes out of the camera module 10 farthest with respective to the image sensor 14.

A method for measuring a total track length of the lens 162 using the system 100, is described in the following steps:

(1) mounting the camera module 10 without the lens system 16 under the testing chart 20, referring to FIG. 1, the image sensor 14 of the camera module 10 being received in the bottom end of the receiving space 120 of the holder 12 and facing the testing chart 20 via the opening 121 of the holder 12;

(2) adjusting the camera module 10 to make a central axis of the image sensing area of the image sensor 14 coaxial with a central axis of the frame pattern 221 of the testing chart 20;

(3) disposing the range finder 30 between the testing chart 20 and the camera module 10, the range finder 30 emitting a laser light to the top surface of the image sensor 14 and receiving the laser light reflected by the image sensor 14 via the emitting and receiving unit 32, so as to measure the first distance H between the top surface of the image sensor 14 and the range finder 30;

(4) installing the lens system 16 into the camera module 10, referring to FIG. 2, an optical axis of the lens 162 being aligned with the central axis of the image sensing area of the image sensor 14;

(5) adjusting the lens 162 to move telescopically along an axial direction by analyzing the image associated with the line pair patterns 222, 223, 224 on the image sensor 14, so as to make the lens 162 focusing on a precision focal position;

(6) the range finder 30 emitting another laser light to the top surface of the top wall 161 of the lens barrel 160 and receiving the laser light reflected by the top surface of the top wall 161 via the emitting and receiving unit 32, so as to measure the second distance h between the top wall 161 and the range finder 30;

(7) calculating the distance difference between the first distance H and the second distance h, so as to obtain the total track length of the lens 162;

(8) displaying the total track length of the lens 162 to a user via the display screen 44.

In step (2), the central axis of the image sensor 14 and the central axis of the frame pattern 221 can be easily defined by geometry. In step (4), since the image associated with the frame pattern 221 and the line pair patterns 222, 223, 224 is displayed on the display screen 44 via the image sensor 14, it is easy to determine whether the central axis of the image sensing area of the image sensor 14 is align with that of the frame pattern 221 of the testing chart 20 by moving the camera module 10 until the image associated with the frame pattern 221 is centrosymmetric about a center line of the display screen 44. In steps (5) and (6), the lens 162 and the image sensor 14 can capture the image associated with all of the line pair patterns 222, 223, 224 therein, or capture images associated with the respective line pair patterns 222, 223, 224, and the processor 42 can process the respective images and thus obtain a modulation transfer function value representative of a precision focal position of the lens 162. On this precision focusing position, the lens 162 protrudes out of the holder 12 farthest respective to the image sensor 14, thus, the maximal total track length of the lens 162 is obtained.

It is understood that the above-described embodiments are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. A system for measuring a total track length of a telescopic lens, the telescopic lens and an image sensor received in a holder, the telescopic lens being movable relative to the image sensor, the system comprising:
    a testing chart having a frame pattern and a plurality of line pair patterns arranged in the frame pattern, each of the line pair patterns including a plurality of black and white line pairs, the testing chart facing the holder;
    a light source for illuminating the testing chart; the testing chart being configured for facing and aligning with the image sensor for allowing the image sensor to capture an image of the line pair patterns of the testing chart;
    a processor configured for analyzing the line pair patterns of the testing chart of the image generated by the image sensor, so as to obtain a modulation transfer function value representative of a precision focal position of the lens;
    a display screen configured for displaying the image generated by the image sensor and the modulation transfer function value thereon; and
    a range finder configured for measuring a first distance between the image sensor and the range finder, a second distance between the lens and the range finder, and calculating a distance difference between the first distance and the second distance to obtain the total track length of the lens.

2. The system as described in claim 1, wherein a distance between the testing chart and the camera module is substantially equal to a minimum focus distance of the lens.

3. The system as described in claim 1, wherein the range finder comprises an emitting and receiving unit, the emitting and receiving unit configured for emitting a laser beam to a sensing surface of the image sensor and receiving the laser beam reflected by the image sensor, so as to obtain the first distance therebetween, the emitting and receiving unit configured for emitting another laser beam to an exterior surface of the lens and receiving the laser light reflected by the lens, so as to obtain the second distance therebetween.

4. The system as described in claim 1, wherein at least two of the line pair patterns are different from each other in spatial frequency.

5. The system as described in claim 1, wherein the line pairs of adjacent line pair patterns are perpendicular to each other.

6. A method for measuring a total track length of a telescopic lens, comprising:
    providing a testing chart, the testing chart having a frame pattern and a plurality of line pair patterns arranged in the frame pattern, each of the line pair patterns including a plurality of black and white line pairs;
    aligning the image sensor with the frame pattern of the testing chart;
    providing a range finder;
    measuring a first distance between the image sensor and the range finder using the range finder;
    mounting a lens into the holder, the lens disposed between the image sensor and the testing chart;
    analyzing an image of the line pair patterns of the testing chart while adjusting a distance between the lens and the image sensor, so as to cause the lens focusing on a precision focal position;
    measuring a second distance between the lens and the range finder using the range finder;
    calculating a distance difference between the first distance and the second distance, so as to obtain the total track length of the lens, and
    displaying the total track length of the lens to a user.

7. The method as described in claim 6, wherein the frame pattern is highlighted relative to the line pair patterns.

8. The method as described in claim 6, further comprising determining whether the frame pattern in the image of the testing chart is centrosymmetric about a center of the image sensing area of the image sensor, after mounting the lens into the holder, if not, moving the lens until the frame pattern in the image of the testing chart is centrosymmetric about the center of the image sensing area of the image sensor.

9. The method as described in claim 6, wherein a distance between the lens and the testing chart is substantially equal to a minimum focus distance of the lens.

10. The method as described in claim 9, further comprising analyzing the image of the testing chart from the image sensor, so as to obtain a modulation transfer function value representative of a precision focal position of the lens.

11. The method as described in claim 10, further comprising displaying the image of the testing chart from the image sensor and the modulation transfer function value from the processor thereon.

12. The method as described in claim 6, wherein at least two of the line pair patterns are different from each other in spatial frequency.

13. The method as described in claim 6, wherein the line pairs of adjacent line pair patterns are perpendicular to each other.

* * * * *